US011935494B2

(12) United States Patent
He

(10) Patent No.: US 11,935,494 B2
(45) Date of Patent: Mar. 19, 2024

(54) TELEVISION BACKLIGHT DIMMING METHOD, APPARATUS AND DEVICE, AND COMPUTER-READABLE STORAGE MEDIUM

(71) Applicant: SHENZHEN TCL DIGITAL TECHNOLOGY LTD., Shenzhen (CN)

(72) Inventor: Wenhui He, Shenzhen (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 17/758,130

(22) PCT Filed: Aug. 28, 2020

(86) PCT No.: PCT/CN2020/112125

§ 371 (c)(1),
(2) Date: Jun. 28, 2022

(87) PCT Pub. No.: WO2021/135327

PCT Pub. Date: Jul. 8, 2021

(65) Prior Publication Data

US 2023/0037624 A1 Feb. 9, 2023

(30) Foreign Application Priority Data

Dec. 31, 2019 (CN) ........................ 201911425756.X

(51) Int. Cl.
*G09G 3/34* (2006.01)

(52) U.S. Cl.
CPC ... *G09G 3/3426* (2013.01); *G09G 2320/0626* (2013.01); *G09G 2320/0686* (2013.01)

(58) Field of Classification Search
None
See application file for complete search history.

(56) References Cited

U.S. PATENT DOCUMENTS

2010/0020267 A1 1/2010 Kobayashi et al.
2012/0257140 A1 10/2012 Shimizu
(Continued)

FOREIGN PATENT DOCUMENTS

CN 201093370 Y 7/2008
CN 101839423 A 9/2010
(Continued)

OTHER PUBLICATIONS

International Search Report in International application No. PCT/CN2020/112125, dated Nov. 26, 2020.
(Continued)

*Primary Examiner* — Matthew Yeung
(74) *Attorney, Agent, or Firm* — PV IP PC; Wei Te Chung; Zhigang Ma

(57) ABSTRACT

The present application provides a television backlight dimming method, apparatus and device, and a computer-readable storage medium. The television backlight dimming method includes: acquiring a minimum horizontal distance between an LED lamp in a reference region and an LED lamp in a non-reference region; and dimming the brightness of each of the LED lamps in the non-reference region according to the brightness of the LED lamp in the reference region, the minimum horizontal distance and a preset distance rule.

19 Claims, 3 Drawing Sheets

(56) References Cited

U.S. PATENT DOCUMENTS

| | | | | |
|---|---|---|---|---|
| 2014/0092000 | A1* | 4/2014 | Nonaka | G09G 3/3426 345/102 |
| 2016/0260392 | A1 | 9/2016 | Yamazaki et al. | |
| 2023/0077136 | A1* | 3/2023 | Wang | G09G 3/3426 |

FOREIGN PATENT DOCUMENTS

| | | | |
|---|---|---|---|
| CN | 101975356 | A | 2/2011 |
| CN | 201741368 | U | 2/2011 |
| CN | 102537754 | A | 7/2012 |
| CN | 102798078 | A | 11/2012 |
| CN | 103499072 | A | 1/2014 |
| CN | 104246349 | A | 12/2014 |
| CN | 205824663 | U | 12/2016 |
| CN | 106537235 | A | 3/2017 |
| CN | 107103893 | Y | 8/2017 |
| CN | 109817160 | A | 5/2019 |
| CN | 111128081 | A | 5/2020 |
| JP | H10208529 | A | 8/1998 |
| WO | 2019237855 | A1 | 12/2019 |

OTHER PUBLICATIONS

Written Opinion of the International Search Authority in international application No. PCT/CN2020/112125 dated Nov. 26, 2020.

1st Office Action issued in corresponding Chinese Patent Application No. 201911425756.X, dated Apr. 9, 2021, pp. 1-12.

Zhu, Yingying, Chinese Master's Theses Full-text Database, A Hardware Design of the Smart TV with the Direct Back-light Technology, Nov. 30, 2017, I136-655.

European Search report in European application No. 20909181.8, dated Nov. 23, 2022.

* cited by examiner

TELEVISION BACKLIGHT DIMMING METHOD, APPARATUS AND DEVICE, AND COMPUTER-READABLE STORAGE MEDIUM

CROSS-REFERENCE TO RELATED APPLICATION

This disclosure is a US national phase application based upon an International Application No. PCT/CN2020/112125, filed on Aug. 28, 2020, which claims priority to a Chinese patent application with an application date of Dec. 31, 2019, an application number of "201911425756.X", and an application title of "TELEVISION BACKLIGHT DIMMING METHOD, APPARATUS AND DEVICE, AND COMPUTER-READABLE STORAGE MEDIUM", entire contents of which are by reference incorporated in its entirety in this disclosure.

BACKGROUND OF DISCLOSURE

Field of Disclosure

The present disclosure relates to a technical field of televisions, and in particular, to a television backlight dimming method, apparatus and device, and a computer-readable storage medium.

Description of Prior Art

At present, most televisions with local dimming backlight technology have a number of light-emitting diode (LED) lamp regions in a backlight evenly arranged at equal intervals, which has an advantage of simplicity and uniform backlight. However, as television screens get larger and larger, there are more and more local dimming lamp regions, so that it is more and more obvious that an upper limit of the number of lamp regions is affected by a microcontroller unit (MCU) resources and system-on-a-chi (SoC) terminal resources, which seriously affects a local dimming effect of large-screen televisions. With a sharp increase in the number of lamp regions, cost of televisions also increases significantly.

Above content is only used to assist understanding of technical solution of the present application, and does not mean that the above content is prior art.

BRIEF SUMMARY OF DISCLOSURE

The main purpose of the present application is to provide a television backlight dimming method, apparatus and device, and a computer-readable storage medium, which aims to solve a problem that with enlargement of television screens in a prior art, a number of its lamp regions in the backlight is also increasing rapidly, and production cost of the televisions is constantly increasing.

According to an embodiment of the present disclosure, a television backlight dimming method is disclosed. In a first aspect, a backlight includes M rows and N columns of LED lamps, in each row of the LED lamps, a distance between two adjacent LED lamps is an arithmetic progression or a geometric progression from a center to an edge, the television backlight dimming method includes following steps: acquiring a minimum horizontal distance between an LED lamp in a reference region and an LED lamp in a non-reference region; and adjusting brightness of each of the LED lamps in the non-reference region according to brightness of the LED lamps in the reference region, the minimum horizontal distance, and a preset distance rule.

According to an embodiment of the present disclosure, the preset distance rule includes a first distance rule corresponding to the arithmetic progression, the step of adjusting the brightness of each of the LED lamps in the non-reference region according to the brightness of the LED lamps in the reference region, the minimum horizontal distance and the preset distance rule includes: determining each of first horizontal LED lamps in a same row among the LED lamps in each of non-reference regions according to the LED lamps in the reference region; and adjusting brightness of each of the first horizontal LED lamps according to the brightness of the LED lamps in the reference region, the minimum horizontal distance, a preset horizontal common difference, and the first distance rule, and adjusting the brightness of each of the LED lamps in the non-reference region according to the brightness of each of the first horizontal LED lamps.

According to an embodiment of the present disclosure, the step of adjusting the brightness of each of the LED lamps in the non-reference region according to the brightness of each of the first horizontal LED lamps includes: making sure that a distance between each column of the LED lamps is same; and adjusting brightness of LED lamps in each row in the non-reference region according to the brightness of each of the first horizontal LED lamps, and adjusting the brightness of each of the LED lamps in the non-reference region according to the brightness of the LED lamps in each row.

According to an embodiment of the present disclosure, the step of adjusting the brightness of LED lamps in each row in the non-reference region according to the brightness of each of the first horizontal LED lamps includes: determining brightness of the LED lamps of the first horizontal LED lamps in a target row according to the brightness of each of the first horizontal LED lamps, and adjusting brightness of the LED lamps in other rows in the backlight except the target row to be a same brightness as the brightness of the LED lamps in the target row.

According to an embodiment of the present disclosure, the step of adjusting the brightness of each of the LED lamps in the non-reference region according to the brightness of each of the first horizontal LED lamps further includes: making sure that a distance between each column of the LED lamps is not same; acquiring a minimum vertical distance between the LED lamps in the reference region and the LED lamps in the non-reference region, and determining that the distance between each column of the LED lamps is an arithmetic progression from the center to the edge; adjusting brightness of LED lamps in each row according to the brightness of the LED lamps in the reference region, the minimum vertical distance, and a preset vertical common difference; and adjusting the brightness of each of the LED lamps in the non-reference region according to the brightness of LED lamps in each row and the brightness of each of the first horizontal LED lamps.

According to an embodiment of the present disclosure, the step of adjusting the brightness of each of the LED lamps in the non-reference region according to the brightness of each of the first horizontal LED lamps further includes: making sure that a distance between each column of the LED lamps is not same; acquiring a minimum vertical distance between the LED lamps in the reference region and the LED lamps in the non-reference region, and determining that the distance between each column of the LED lamps is a geometric progression from the center to the edge; adjusting brightness of LED lamps in each row according to the brightness of the LED lamps in the reference region, the minimum vertical distance, and a preset vertical geometric difference value; and adjusting the brightness of each of the LED lamps in the non-reference region according to the brightness of LED lamps in each row and the brightness of each of the first horizontal LED lamps.

According to an embodiment of the present disclosure, the preset distance rule includes a second distance rule corresponding to the geometric progression, the step of adjusting the brightness of each of the LED lamps in the non-reference region according to the brightness of the LED lamps in the reference region, the minimum horizontal distance and a preset distance rule includes: determining each of second horizontal LED lamps in a same row among the LED lamps in each of non-reference regions according to the LED lamps in the reference region; and adjusting brightness of each of the second horizontal LED lamps according to the brightness of the LED lamps in the reference region, the minimum horizontal distance, a preset horizontal geometric difference value, and the second distance rule, and adjusting the brightness of each of the LED lamps in the non-reference region according to the brightness of each of the second horizontal LED lamps.

According to an embodiment of the present disclosure, the reference region is an area in a middle of the backlight in a horizontal direction; the non-reference region is an area in the backlight except the reference region; and the minimum horizontal distance is a horizontal distance between the LED lamps in the reference region and the LED lamps in the non-reference region in the horizontal direction of the backlight.

According to an embodiment of the present disclosure, if user is not satisfied with the step of adjusting brightness of each of the LED lamps in the non-reference region according to brightness of the LED lamps in the reference region, the minimum horizontal distance, and a preset distance rule, adjust one of the LED lamps of the backlight individually according to a compensation coefficient.

According to an embodiment of the present disclosure, a television backlight dimming apparatus is disclosed. In a second aspect, a backlight includes M rows and N columns of LED lamps, in each row of the LED lamps, a distance between two adjacent LED lamps is an arithmetic progression or a geometric progression from a center to an edge, the television backlight dimming apparatus includes: an acquisition module, used for acquiring a minimum horizontal distance between an LED lamp in a reference region and an LED lamp in a non-reference region; and an adjustment module, used for adjusting brightness of each of the LED lamps in the non-reference region according to brightness of the LED lamps in the reference region, the minimum horizontal distance, and a preset distance rule.

According to an embodiment of the present disclosure, a television backlight dimming device is disclosed. In a third aspect, the television backlight dimming device includes: a memory, a processor, and a television backlight adjusting program stored on the memory and being executed in the processor, when the television backlight adjusting program is executed by the processor, the steps of the television backlight dimming method mentioned above.

According to an embodiment of the present disclosure, a computer-readable storage medium is disclosed. In a fourth aspect, the computer-readable storage medium stores a television backlight adjusting program, when the television backlight adjusting program is executed by a processor, the steps of the television backlight dimming method mentioned above.

An embodiment of the present application provide a television backlight dimming method, apparatus and device, and a computer-readable storage medium, in each row of the LED lamps, the distance between two adjacent LED lamps is the arithmetic progression or the geometric progression from the center to the edge, and adjust brightness of each of the LED lamps in the non-reference region according to the minimum horizontal distance between the LED lamps in the reference region and the LED lamps in the non-reference region, the brightness of the LED lamps in the reference region and the preset distance rule. Therefore, it is possible to properly non-uniform an arrangement of lamp regions without increasing or slightly increasing the lamp regions, so that a density of the lamp regions in a central part of television screen is greatly increased, which saves users' cost and solves a problem that with enlargement of television screens in the prior art, a number of its lamp regions in the backlight is also increasing rapidly, and production cost of the televisions is constantly increasing.

Implementation, functional characteristics and advantages of the present application will be further described with reference to accompanying drawings in conjunction with embodiment.

DETAILED DESCRIPTION OF PREFERRED EMBODIMENTS

It can be understood that the specific embodiments described herein are only used to explain the present application, but not to limit the present application.

Figure 1:
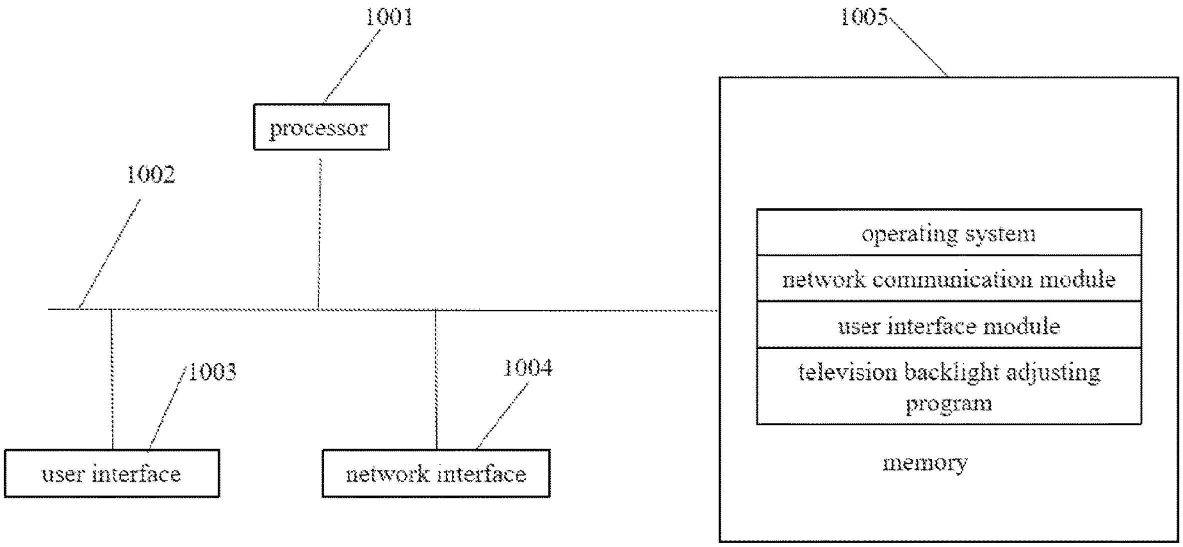
FIG. 1 is a schematic view of a television structure of a hardware operating environment according to an embodiment of the present application.
Figure 2:
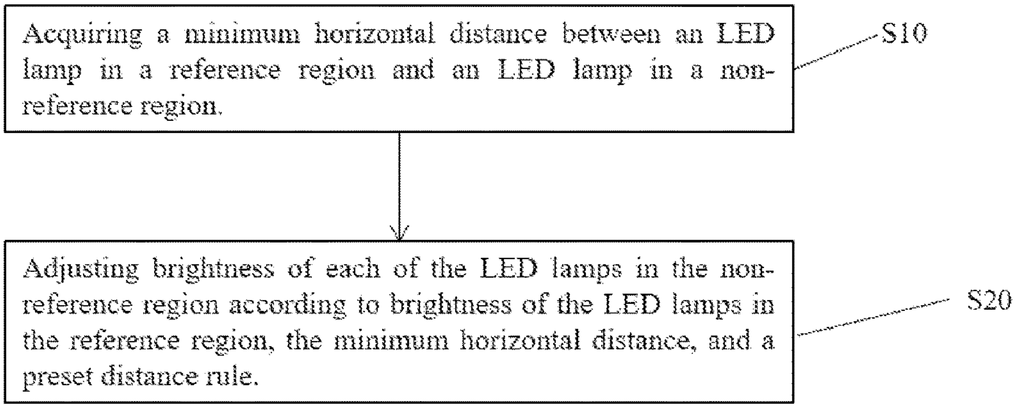
FIG. 2 is a flowchart of a television backlight dimming method in a first embodiment of the present application.

As shown in FIG. 1, FIG. 1 is a schematic view of a television structure of a hardware operating environment according to an embodiment of the present application.

A television in the embodiment of the present application includes an audio channel, a display interface, and the like.

As shown in FIG. 1, the television may include: a processor 1001, such as a CPU; a network interface 1004; a user interface 1003; a memory 1005; and a communication bus 1002. Wherein, the communication bus 1002 is used to realize a connection and communication between these components. The user interface 1003 may include a display screen, an input unit such as a keyboard, and an optional user interface 1003 may also include a standard wired interface and a standard wireless interface. Optionally, the network interface 1004 may include a standard wired interface and a standard wireless interface (e.g., a WI-FI interface). The memory 1005 may be a high-speed RAM memory, or may be a non-volatile memory, such as disk memory. Optionally, the memory 1005 may also be a storage device independent of the aforementioned processor 1001.

Optionally, the television may further include a camera, an RF (Radio Frequency, radio frequency) circuit, a sensor, an audio circuit, a WI-FI module, and the like. Wherein, the sensor may be light sensor, motion sensor, and other sensor. Specifically, the light sensor may include an ambient light sensor and a proximity sensor, wherein the ambient light sensor may adjust brightness of a display screen according to brightness of ambient light, and the proximity sensor may turn off the display screen and/or backlight when a terminal unit is moved to an ear. Of course, the television can also be equipped with other sensor such as gyroscope, barometer, hygrometer, thermometer, infrared sensor, etc., which will not be repeated here.

Those skilled in the art can understand that the television structure shown in FIG. 1 does not constitute a limitation to the television, and may include more or less components than the one shown, or combine some components, or arrange different components.

As shown in FIG. 1, the memory 1005 as a computer storage medium may include an operating system, a network communication module, a user interface module, and a television backlight adjusting program.

In a terminal shown in FIG. 1, the network interface 1004 is mainly used to connect with a backend server and perform data communication with the background server; the user interface 1003 is mainly used to connect with a client side and perform data communication with the client side; and the processor 1001 can be used to call the television backlight adjusting program stored in the memory 1005 and perform following operations:

acquiring a minimum horizontal distance between a light-emitting diode (LED) lamp in a reference region and an LED lamp in a non-reference region;

adjusting brightness of each of the LED lamps in the non-reference region according to brightness of the LED lamps in the reference region, the minimum horizontal distance, and a preset distance rule.

The present application provides a television backlight dimming method. In an embodiment of the television backlight dimming method, the television backlight dimming method includes following steps:

Step S10: acquiring a minimum horizontal distance between an LED lamp in a reference region and an LED lamp in a non-reference region;

In this embodiment, a backlight includes M rows and N columns of LED lamps, in each row of the LED lamps, a distance between two adjacent LED lamps is an arithmetic progression or a geometric progression from a center to an edge.

Therefore, in this embodiment, in a horizontal direction, an arrangement of lamp regions of each of the LED lamps can start from a center part of a television screen, and a distance between the lamp regions can be sequentially increased in a left-and-right symmetry according to a rule of arithmetic progression. It is also possible that the arrangement of the lamp regions of each of the LED lamps can start from a center part of the backlight of the television screen, and the distance between the lamp regions can be sequentially increased in a left-and-right symmetry according to a rule of geometric progression, and in a vertical direction, when a height of the television screen is greater than a certain value, an arrangement of the lamp regions can start from the center part of the backlight, and the distance between the lamp regions can be sequentially increased in an up-and-down symmetry according to the rule of arithmetic progression. That is to say, in this embodiment, under a condition that the lamp regions in the backlight of the television screen are not increased or slightly increased, appropriate non-uniform arrangement can be performed on a distribution of the lamp regions, so that a density of the lamp regions in the central part of the backlight is greatly increased, a local dimming effect is greatly improved. For example, arranging a backlight partition of the backlight of the television screen be ROWS rows*COLUMNS columns, a distance of a central part of the lamp regions in the horizontal direction (i.e., a distance of a first central lamp region) is A, an arithmetic difference value is S, a distance of an edge lamp region can be acquired according to a formula A+S*(COLUMNS/2−1). In this embodiment, it is necessary that a sum of all distances in a same row is less than half of a width of the television screen. In addition, if it is necessary to arrange a distance between the lamp regions of the LED lamps in a vertical direction to be non-uniform, that is, when arranging according to the arithmetic progression or the geometric progression, an arrangement of the lamp regions is same as the arrangement of the lamp regions in the horizontal direction. For example, arranging the backlight partition of the television screen be ROWS rows*COLUMNS columns, a distance of the central part of the lamp regions in the vertical direction (i.e., a distance of a second central lamp region) is B, an arithmetic difference value is S, a distance of a second edge lamp region can be acquired according to a formula B+K*(ROWS/2−1). In this embodiment, it is necessary that a sum of all distances in a same column is less than half of the height of the television screen.

Therefore, after determining a distance between the lamp region of the LED lamps in each row, it is also necessary to acquire the minimum horizontal distance between the LED lamps in the reference region and the LED lamps in the non-reference region in the backlight. Wherein, the reference region may be an area in a middle of the backlight in the horizontal direction, and a size of the area may be arbitrarily set by user. The LED lamps in the non-reference region may be areas except the reference region in the backlight. The minimum horizontal distance may be a horizontal distance between the LED lamps in the reference region and the LED lamps in the non-reference region in a horizontal direction of the backlight.

Step S20: adjusting brightness of each of the LED lamps in the non-reference region according to brightness of the LED lamps in the reference region, the minimum horizontal distance, and the preset distance rule.

In this embodiment, after acquiring the minimum horizontal distance between the LED lamps in the reference region and the LED lamps in the non-reference region, it is also necessary to consider whether a distance of each of the LED lamps of the backlight in the vertical direction is uniformly arranged, if so, it can be sure that brightness of LED lamps in each row is same. Acquire the brightness of the LED lamps in the reference region and determine that whether a distance of two adjacent LED lamps in each row of the LED lamps is the arithmetic progression or the geometric progression from the center to the edge. If it is the arithmetic progression, a formula of calculating the brightness of each of the LED lamps in the non-reference region (i.e., the preset distance rule) can be $L(x)=Lmin*(Smin+k*^{x})/Smin*$. Wherein, Lmin is the brightness of the LED lamps in the reference region, Smin is the minimum horizontal distance, k is a preset horizontal common difference, and x is numbers of columns away from the reference region in the horizontal direction, and after calculating the brightness of each of the LED lamps, adjust the brightness of each of the LED lamps in the non-reference region according to a calculation result.

If it is the geometric progression, a formula of calculating the brightness of each of the LED lamps in the non-reference region (i.e., the preset distance rule) can be $L(x)=Lmin*(Smin*k^x)/Smin=Lmin*k^x$. Wherein, Lmin is the brightness of the LED lamps in the reference region, Smin is the minimum horizontal distance, k is a preset horizontal geometric difference value, and x is numbers of columns away from the reference region in the horizontal direction, and after calculating the brightness of each of the LED lamps, adjust the brightness of each of the LED lamps in the non-reference region according to a calculation result.

It should also be noted that, when the distance of each of the LED lamps in the backlight in the vertical direction is not uniformly arranged, the distance of each of the LED lamps in the vertical direction and the distance of each of the LED lamps in the horizontal direction need to be considered at a same time. If the distance of the LED lamps in the vertical direction and the distance of the LED lamps in the horizontal direction are both the arithmetic progressions, brightness of the LED lamps in each row and each column needs to be compensated accordingly. That is, brightness of the LED lamps in the central part of the backlight is lowest, and brightness of the LED lamps at edges is higher. Wherein, four-corner lamp regions of the television screen have a highest brightness. At this time, the brightness of the four-corner lamp regions can be Lmax=L*(A+S*(COLUMNS/2−1))*(B+K*(ROWS/2−1))/(A*B), wherein L is the brightness of the LED lamps in the reference region, A is the minimum horizontal distance, S is the preset horizontal common difference, B is a minimum vertical distance, and K is a preset vertical common difference. Brightness of lamp regions at the edge of other locations can also adopt a same method.

If the distance of each of the LED lamps in the vertical direction and the distance of each of the LED lamps in the horizontal direction are both the geometric progressions, a formula of the brightness of the LED lamps in the non-reference region may be:

$L(x,y)=Lmin*(Smin*k^x)*(Smin*k^y)/(Smin*Smin)=Lmin*k^{x+y}$. Wherein, Lmin is the brightness of the LED lamps in the reference region, Smin is the minimum horizontal distance, k is a preset geometric difference value, x is numbers of columns away from the reference region in the horizontal direction, and y is numbers of rows away from the reference region in the vertical direction.

And if the user is not satisfied with the step of adjusting the brightness of each of the LED lamps in the non-reference region according to the brightness of the LED lamps in the reference region, the minimum horizontal distance, and the preset distance rule, a compensation coefficient can be added, and according to the compensation coefficient R, a certain LED lamp in the backlight is individually adjusted.

Figure 4:
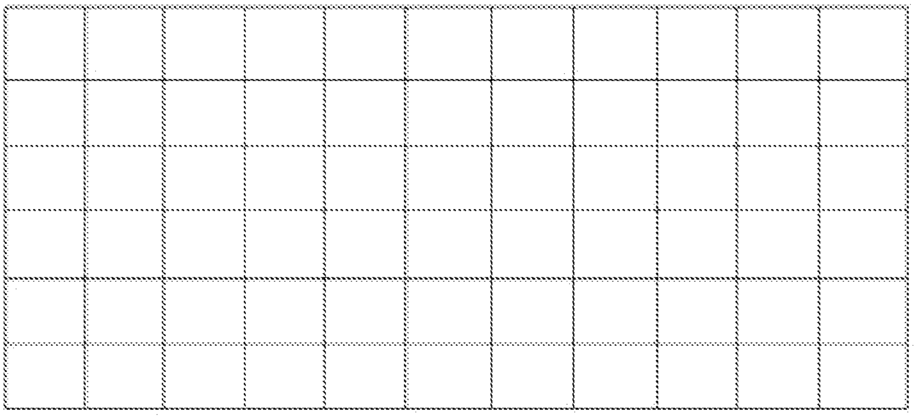
FIG. 4 is a schematic view of an equidistant backlight arrangement of a television backlight dimming method in an embodiment of the present application.
Figure 5:
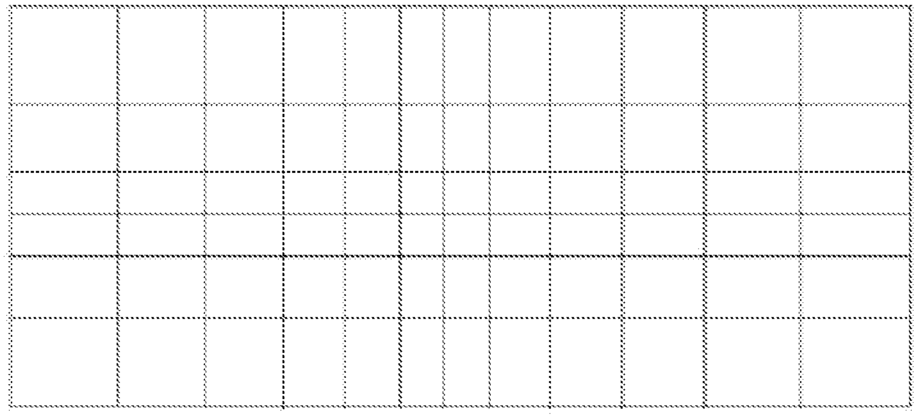
FIG. 5 is a schematic view of a backlight region arrangement of a television backlight dimming method in an embodiment of the present application.

For example, taking a 100-inch 16:9 display screen as an example, there are 264 lamp regions in 12 rows and 22 columns. If they are arranged at equal intervals, that is, uniformly arranged, and the horizontal and vertical directions of the lamp regions are 4, a final distribution of the lamp regions is shown in the FIG. 4. However, when the arithmetic progression is non-uniformly arranged, as shown in FIG. 5, a center distance can be set to 2 inches, an adjacent distance of each row and each column is increased by 0.4 inches (that is, an arithmetic difference value is 0.4 inches), and a horizontal edge distance is 6 inches, a vertical edge distance is 4 inches, a density of the lamp regions in a central part will be tripled, and picture quality and local dimming effect will be doubled. At this time, the lamp regions of other positions in the center part of the television screen can be calculated according to the general formula, so the brightness of the four-corner lamp regions can be Lmax=Lmin*(2+0.4*(22/2−1))*(2+0.4*(12/2−1))/(2*2)=6Lmin, and brightness of lamp regions at other positions is deduced in turn, and so on, Lmin is brightness in the reference region. Wherein, a general formula is as follows: if a minimum distance is Smin, the arithmetic difference value is k, x is a number of columns away from central in the horizontal direction, y is a number of rows away from central in the vertical direction, brightness of a lamp at a position is L(x, y)=Lmin*(Smin+k*x)*(Smin+k*y)/(Smin*Smin). It should be noted that if the lamp regions of the television screen are arranged according to the geometric progression, k in the general formula is a geometric difference value, and the brightness of the lamp at this position is $L(x, y)=Lmin*(Smin*k^x)*(Smin*k^y)/(Smin*Smin)=Lmin*k^{x+y}$.

In addition, apart from performing a non-uniform processing on the lamp regions in the backlight of the television screen in the horizontal direction and the vertical direction, there is another situation, that is, a non-uniform processing is performed on the lamp regions in the backlight of the television screen in the horizontal direction, and a non-uniform processing is performed on the lamp regions in the backlight of the television screen in the vertical direction. At this time, brightness of the lamp regions in each column is same, and brightness of the lamp regions at a left edge and a right edge can be Lmax=Lmin*(2+0.4*(22/2−1))/2=3Lmin. Brightness of the lamp regions at other positions is analogous, and a general formula under the rule of the arithmetic progression is as follows: setting the minimum distance to be Smin, the arithmetic difference value to be k, and the numbers of columns away from the center in the horizontal direction to be x, then brightness of the lamps in this column is L(x)=Lmin*(Smin+k*x)/Smin. The general formula under the rule of geometric progression is as follows: if the geometric difference value is k, then brightness of the lamps in this column is $L(x)=Lmin*(Smin*k^x)/Smin=Lmin*k^x$.

In this embodiment, in each row of the LED lamps, the distance between two adjacent LED lamps is the arithmetic progression or the geometric progression from the center to the edge, the brightness of each of the LED lamps in the non-reference region is adjusted according to the minimum horizontal distance between the LED lamps in the reference region and the LED lamps in the non-reference region, the brightness of the LED lamps in the reference region and the preset distance rule. Therefore, arrangement of the lamp regions can be properly non-uniformly performed without increasing or slightly increasing the lamp regions, so that the density of the lamp regions in the central part of the television screen is greatly increased, the users' cost is saved, and a problem in the prior art is solved that with enlargement of the television screen, number of its backlight regions is also increasing sharply, and production cost of the television is increasing.

Furthermore, according to the first embodiment of the present application, a second embodiment of the television backlight dimming method of the present application is further proposed, this embodiment is a refinement of step S20 in the first embodiment of the present application of adjusting the brightness of each of the LED lamps in the non-reference region according to the brightness of the LED lamps in the reference region, the minimum horizontal distance, and the preset distance rule, includes:

Step a, determining each of first horizontal LED lamps in a same row among the LED lamps in each of non-reference regions according to the LED lamps in the reference region;

In this embodiment, the preset distance rule includes a first distance rule corresponding to the arithmetic progression, that is, a distance of the lamp regions of each of the LED lamps in each row is calculated according to a calculation formula of the arithmetic progression, brightness of each of the LED lamps in the horizontal direction is calculated according to a brightness calculation formula corresponding to the distance of the lamp regions and the arithmetic progression.

After determining the LED lamps in the reference region in the backlight, acquire each of the first horizontal LED lamps in a same row among each of the LED lamps in each of the non-reference regions according to the LED lamps in the reference region, that is, each of the first horizontal LED lamps and a certain one or more LED lamps in the reference region are in a same row. Wherein, the first horizontal LED lamps are LED lamps among one or more LED lamps in the non-reference region and the reference region in a same row.

Step b, adjusting brightness of each of the first horizontal LED lamps according to the brightness of the LED lamps in the reference region, the minimum horizontal distance, a preset horizontal common difference, and the first distance rule, and adjusting the brightness of each of the LED lamps in the non-reference region according to the brightness of each of the first horizontal LED lamps.

After acquiring each of the first horizontal LED lamps, it is necessary to acquire the brightness of the LED lamps in reference region, and acquire the preset horizontal common difference, and then perform calculation according to the first distance rule to acquire the brightness of each of the first horizontal LED lamps. Then, adjust the brightness of each of the LED lamps in the non-reference region according to a calculated brightness of each of the first horizontal LED lamps, that is, adjust the brightness of the LED lamps in each row in the non-reference region. The horizontal common difference is set by the user in advance for an equal difference value in the horizontal direction.

In this embodiment, adjust the brightness of each first horizontal LED lamps in a same row according to the brightness of the LED lamps in the reference region, the minimum horizontal distance, the preset horizontal common difference and the first distance rule, and adjust the brightness of each of the LED lamps in the non-reference region according to the brightness of the first horizontal LED lamps. Therefore lighting effect of the LED lamps in the backlight is guaranteed.

Furthermore, the step of adjusting the brightness of each of the LED lamps in the non-reference region according to the brightness of the first horizontal LED lamps includes:

Step c, checking whether the distance of each column of the LED lamps is same;

In this embodiment, in addition to calculating the brightness of each of the LED lamps in the horizontal direction, it is also necessary to check a distance of the LED lamps in the backlight in the vertical direction, that is, to check whether the distance of each column of the LED lamps is same, and according to different checking results performs different operations.

Step d, adjusting the brightness of the LED lamps in each row in the non-reference region according to the brightness of each of the first horizontal LED lamps if they are same, and determining brightness of each of the LED lamps in the non-reference region according to the brightness of the LED lamps in each row.

When it is found that the distance of the LED lamps in each column is same, it can be determined that the distance of the LED lamps in each column is uniformly arranged. At this time, it is not necessary to consider changes to the brightness of each of the LED lamps in the vertical direction, but only consider the horizontal direction. That is, it is only necessary to calculate brightness of the LED lamps of a certain row, and then brightness of the LED lamps of all rows in the backlight can be adjusted and set according to the brightness of the LED lamps in the row. That is, adjust the brightness of LED lamps in each row in the non-reference region according to the brightness of each of the first horizontal LED lamps, and determine the brightness of each of the LED lamps in the non-reference region according to the brightness of the LED lamps in each row.

In this embodiment, when it is determined that the distance of the LED lamps in each column is the same, adjust the brightness of the LED lamps in each row in the non-reference region directly according to the brightness of each of the first horizontal LED lamps, and determine the brightness of each of the LED lamps in the non-reference region, thus ensuring the lighting effect of the LED lamps in the backlight.

Furthermore, the step of adjusting the brightness of the LED lamps in each row in the non-reference region directly according to the brightness of each of the first horizontal LED lamps includes:

Step z, determining brightness of the LED lamps of the first horizontal LED lamps in a target row according to the brightness of each of the first horizontal LED lamps, and adjusting brightness of the LED lamps in other rows in the backlight except the target row to be same as the brightness of the LED lamps in the target row.

In this implementation, when it is sure that distance of the LED lamps in each column is uniformly arranged, it can be determined that brightness of the LED lamps in the vertical direction in the backlight is not adjusted, that is, the brightness of the LED lamps in each row can be determined to be same. Therefore, the brightness of the LED lamps in the target rows where the first horizontal LED lamps are located can be determined according to calculated brightness of each of the first horizontal LED lamps, and then brightness of LED lamps in other rows in the backlight except the target row are adjusted as the brightness of the LED lamps in the target row. Wherein, the target row is a row where the first horizontal LED lamps are located in the backlight. Other rows are rows except the target row in the backlight.

In this embodiment, by determining the brightness of the LED lamps in the target row according to the brightness of each of the first horizontal LED lamps, and adjusting the brightness of the LED lamps in another rows as same as the brightness of the brightness of the LED lamps in the target row, the lighting effect of the LED lamps in the backlight is ensured.

Furthermore, after the step of checking whether the distance of LED lamps in each column is same, the steps include:

Step e, acquiring a minimum vertical distance between the LED lamps in the reference region and the LED lamps in the non-reference region if they are not same, and determining whether the distance of the LED lamps in each column is the arithmetic progression from the center to the edge;

When it is found that the distance of the LED lamps in each column is different, it can be sure that the distance of the LED lamps in each column is non-uniformly arranged. At this time, two factors, the vertical direction and the horizontal direction, need to be considered to adjust the brightness of each of the LED lamps in the backlight. That is, it is necessary to acquire the minimum vertical distance between the LED lamps in the reference region and the LED lamps in the non-reference region, and determine whether the distance of the LED lamps in each column is arranged in an arithmetic progression from the center to the edge. Then perform different operations according to different determined results. The minimum vertical distance may be a vertical distance between the LED lamps in the reference region and the LED lamps in the non-reference region in the vertical direction in a direction perpendicular to the backlight.

Step f, if yes, adjusting the brightness of the LED lamps in each column according to the brightness of the LED lamps in the reference region, the minimum vertical distance, and a preset vertical common difference;

When it is determined that the distance of the LED lamps in each column is an arithmetic progression from the center to the edge, the brightness of the LED lamps in the reference region is obtained, and the preset vertical common difference is acquired, and it is calculated in a same way as when the distance in the horizontal direction is in the arithmetic progression. That is, the brightness of the LED lamps in each column is adjusted according to the brightness of the LED lamps in the reference region, the minimum vertical distance, and the preset vertical common difference. Wherein, the vertical common difference is an equal difference value in the vertical direction set by the user in advance.

Step g, adjusting the brightness of each of the LED lamps in the non-reference region according to the brightness of the LED lamps in each column and the brightness of each of the first horizontal LED lamps.

After the brightness of the LED lamps in each column in the backlight is calculated, the brightness of the LED lamps in each row in the backlight can be determined according to the brightness of each of the first horizontal LED lamps in the horizontal direction, and according to the brightness of the LED lamps in each column and the brightness of the LED lamps in each row, the brightness of each of the LED lamps in the non-reference region is adjusted.

In this embodiment, when it is determined that the distance of the LED lamps in each column is an arithmetic progression from the center to the edge, the brightness of the LED lamps in each column is adjusted according to the brightness of the LED lamps in the reference region, the minimum vertical distance, and the preset vertical common difference, and the brightness of each of the LED lamps in the non-reference region according to the brightness of each of the first horizontal LED lamps, thereby ensuring the lighting effect of the LED lamps in the backlight.

Furthermore, after the step of checking whether the distance of the LED lamps in each column is an arithmetic progression from the center to the edge, the steps include:

Step h, if not, then checking whether the distance of the LED lamps in each row is a geometric progression from the center to the edge;

When it is found that the distance of the LED lamps in each column is not an arithmetic progression from the center to the edge, it is also necessary to determine whether the distance of the LED lamps in each column is a geometric progression from the center to the edge, and perform different operations according to different determined results.

Step k, if it is the geometric progression, then adjusting the brightness of the LED lamps in each column according to the brightness of the LED lamps in the reference region, the minimum vertical distance, and a preset vertical geometric difference value;

When it is determined that the distance of the LED lamps in each column is the geometric progression from the center to the edge, it is necessary to acquire the preset vertical geometric difference value, then calculate the brightness of the LED lamps in each column according to the brightness of the LED lamps in the reference region, the minimum vertical distance between the LED lamps in the reference region and the LED lamps in the non-reference region, and the preset vertical geometric difference value, and adjust the brightness of the LED lamps in each column according to calculated brightness. Wherein, the vertical geometric difference value is a proportional value in the vertical direction set in advance by the user. A formula for calculating the brightness of the LED lamps in each column can be same as the formula in the horizontal direction.

Step m: adjusting the brightness of each of the LED lamps in the non-reference region according to the brightness of the LED lamps in each column and the brightness of each of the first horizontal LED lamps.

After the brightness of the LED lamps in each column in the backlight is calculated, the brightness of the LED lamps in each row in the backlight can be determined according to the brightness of each of the first horizontal LED lamps in the horizontal direction, and the brightness of each of the LED lamps in the non-reference region can be adjusted according to the brightness of the LED lamps in each column and the brightness of the LED lamps in each row.

In this embodiment, when it is determined that the distance of the LED lamps in each column is the geometric progression from the center to the edge, adjust the brightness of the LED lamps in each column according to the brightness of the LED lamps in the reference region, the minimum vertical distance, and the preset vertical geometric difference value, and adjust the brightness of each of the LED lamps in the non-reference region according to the brightness of each of the first horizontal LED lamps, thereby ensuring the lighting effect of the LED lamps in the backlight.

Furthermore, according to any one of the first embodiment to the second embodiment of the present application, a third embodiment of the television backlight dimming method of the present application is further proposed. This embodiment is a refinement of step S20 in the first embodiment of the present application of adjusting the brightness of each of the LED lamps in the non-reference region according to the brightness of the LED lamps in the reference region, the minimum horizontal distance, and the preset distance rule, includes:

Step n, determining each of second horizontal LED lamps in a same row among the LED lamps in each of non-reference regions according to the LED lamps in the reference region;

In this embodiment, the preset distance rule includes a second distance rule corresponding to the geometric progression, that is, calculate a distance of the lamp regions of each of the LED lamps in each row according to a calculation formula of the geometric progression, and calculate the brightness of each of the LED lamps in the horizontal direction according to a brightness calculation formula corresponding to the distance of the lamp regions and the geometric progression.

After determining the LED lamps in the reference region in the backlight, acquire each of the second horizontal LED lamps in a same row among each of the LED lamps in each of the non-reference regions according to the LED lamps in the reference region, that is, each of the second horizontal LED lamps and a certain one or more LED lamps in the reference region are in a same row. Wherein, the second horizontal LED lamps are LED lamps among one or more LED lamps in the non-reference region and the reference region.

Step x, adjusting brightness of each of the second horizontal LED lamps according to the brightness of the LED lamps in the reference region, the minimum horizontal distance, a preset horizontal geometric difference value, and the second distance rule, and adjusting the brightness of each of the LED lamps in the non-reference region according to the brightness of each of the second horizontal LED lamps.

After acquiring each of the second horizontal LED lamps, it is necessary to acquire the brightness of the LED lamps in reference region, and acquire the preset geometric difference value, and then perform calculation according to the second distance rule to acquire the brightness of each of the second horizontal LED lamps. Then, adjust the brightness of each of the LED lamps in the non-reference region according to a calculated brightness of each of the second horizontal LED lamps, that is, adjust the brightness of the LED lamps in each row in the non-reference region. A formula for calculating the brightness of the LED lamps in each column is $L(x)=Lmin*(Smin*k^x)/Smin=Lmin*k^x$. k is the geometric difference value, Lmin is the brightness of the LED lamps in the reference region, Smin is the minimum horizontal distance, k is the preset geometric difference value, and x is a number of columns away from the reference region in the horizontal direction. A horizontal geometric difference value is the proportional value in the horizontal direction set by the user in advance.

In this embodiment, the brightness of each of the second horizontal LED lamps in the same row is adjusted according to the brightness of the LED lamps in the reference region, the minimum horizontal distance, the preset horizontal geometric difference value, and the second distance rule, and the brightness of each of the LED lamps in the non-reference region according to the brightness of each of the second horizontal LED lamps, thus ensuring the lighting effect of the LED lamps in the backlight.

Figure 3:
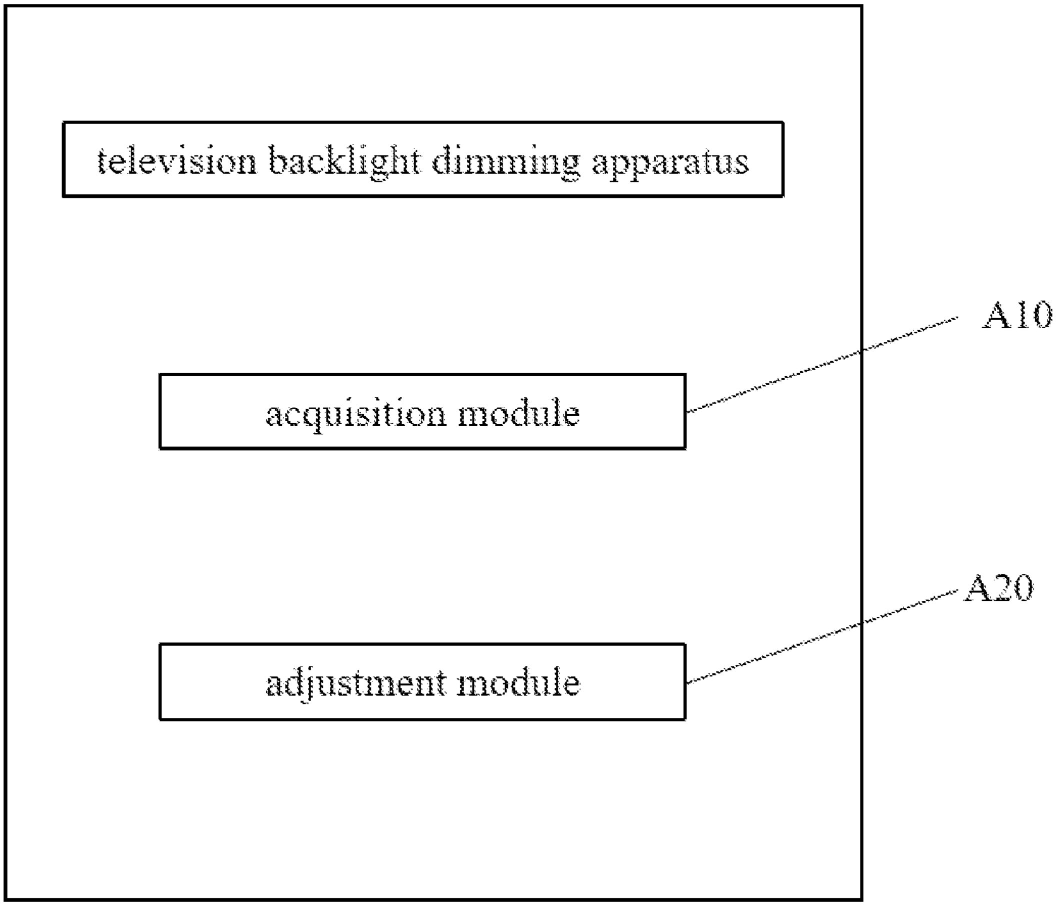
FIG. 3 is a schematic view of a television backlight dimming apparatus in an embodiment of the present application.

In addition, referring to FIG. 3, an embodiment of the present application also proposes a television backlight dimming apparatus, the backlight includes M rows and N columns of LED lamps, and in each row of the LED lamps, the distance between two adjacent LED lamps is an arithmetic progression or a geometric progression from a center to an edge, the television backlight dimming apparatus includes:

an acquisition module A10, used for acquiring a minimum horizontal distance between an LED lamp in a reference region and an LED lamp in a non-reference region;

an adjustment module A20, used for adjusting brightness of each of the LED lamps in the non-reference region according to brightness of the LED lamps in the reference region, the minimum horizontal distance, and a preset distance rule.

Optionally, the preset distance rule includes a first distance rule corresponding to the arithmetic progression, and the adjustment module A20 is used for:

determining each of the first horizontal LED lamps in a same row in each of the LED lamps in each of the non-reference regions according to the LED lamps in the reference region;

adjusting the brightness of each of the first horizontal LED lamps according to the brightness of the LED lamps in the reference region, the minimum horizontal distance, the preset horizontal common difference, and the first distance rule, and adjusting the brightness of each of the LED lamps in the non-reference region according to the brightness of each of the first horizontal LED lamps.

Optionally, the adjustment module A20 is used for:

checking whether the distance of the LED lamps in each column is same;

if they are the same, adjusting the brightness of the LED lamps in each row in the non-reference region according to the brightness of each of the first horizontal LED lamps, and determining each of the LED lamps in the non-reference region according to the brightness of the LED lamps in each row.

Optionally, the adjustment module A20 is used for:

determining brightness of LED lamps of the first horizontal LED lamps in a target row according to the brightness of each of the first horizontal LED lamps, and adjusting brightness of the LED lamps in other rows in the backlight except the target row as same as brightness of the LED lamps in the target row.

Optionally, the adjustment module A20 is used for:

If they are not the same, acquiring the minimum vertical distance between the LED lamps in the reference region and the LED lamps in the non-reference region, and determining whether the distance of the LED lamps in each column is an arithmetic progression from the center to the edge;

if so, adjusting the brightness of the LED lamps in each column according to the brightness of the LED lamps in the reference region, the minimum vertical distance, and a preset vertical common difference;

adjusting the brightness of each of the LED lamps in the non-reference region according to the brightness of the LED lamps in each column and the brightness of each of the first horizontal LED lamps.

Optionally, the adjustment module A20 is used for:

if not, then determining whether the distance of the LED lamps in each column is the geometric progression from the center to the edge;

if it is the geometric progression, then adjusting the brightness of the LED lamps in each column according to the brightness of the LED lamps in the reference region, the minimum vertical distance, and the preset vertical geometric difference value;

adjusting the brightness of the LED lamps in the non-reference region according to the brightness of the LED lamps in each column and the brightness of each of the first horizontal LED lamps.

Optionally, the preset distance rule includes a second distance rule corresponding to the geometric progression, and the adjustment module A20 is used for:

determining each of second horizontal LED lamps in a same row among the LED lamps in each of the non-reference regions according to the LED lamps in the reference region;

adjusting brightness of each of the second horizontal LED lamps according to the brightness of the LED lamps in the reference region, the minimum horizontal distance, the preset horizontal geometric difference value, and the second distance rule, and adjusting the brightness of each of the LED lamps in the non-reference region according to the brightness of each of the second horizontal LED lamps.

Wherein, steps of implementing of each of functional module of the television backlight dimming apparatus can be referred to various embodiments of the television backlight dimming method in the present application, which will not be repeated here.

The present application also provides a television backlight dimming device, the television backlight dimming device includes: a memory, a processor, a communication bus, and a television backlight adjusting program stored on the memory:

the communication bus is used to realize connection and communication between the processor and the memory;

the processor is configured to execute the television backlight adjusting program, so as to realize the steps of the above-mentioned embodiments of the television backlight dimming method.

The present application also provides a computer-readable storage medium, the computer-readable storage medium stores one or more programs, and the one or more programs can also be executed by one or more processors for implementing the above-mentioned steps of the television backlight dimming method in each embodiment.

The specific implementation manner of the computer-readable storage medium of the present application is basically same as that of the above-mentioned embodiments of the television backlight dimming method, and will not be repeated here.

It should be noted that, herein, the terms "include", "contain" or any other variation thereof are intended to encompass non-exclusive inclusion, such that a process, method, article or system including a series of elements includes not only those elements, It also includes other elements not expressly listed or inherent to such a process, method, article or system. Without further limitation, an element qualified by a phrase "include a . . . " does not preclude the presence of additional identical elements in the process, method, article, or system that includes the element.

Above-mentioned serial numbers of the embodiments of the present application are only for description, and do not represent an advantage or disadvantage of the embodiments.

From the description of the above embodiments, those skilled in the art can clearly understand that the methods of the above embodiments can be implemented by means of software adding a necessary general hardware platform, and of course hardware can also be used, but in many cases the former is better implementation. According to this understanding, technical solutions of the present application can be embodied in a form of software products in essence or parts that make contributions to the prior art, and computer software products are stored in a storage medium (such as ROM/RAM, magnetic disk, optical disk) as described above, including several instructions to make a terminal device (which may be a mobile phone, a computer, a server, a television, or a network device, etc.) to execute the methods described in the various embodiments of the present application.

Above are only preferred embodiments of the present application, and are not intended to limit the present application. Any modifications, equivalent structure or equivalent process transformation made within the contents of description and drawings of the present application, or directly or indirectly applied in other related technical fields, are similarly included in the protection range of the present disclosure.

What is claimed is:

1. A television backlight dimming method, wherein a backlight comprises M rows and N columns of LED lamps, in each row of the LED lamps, a distance between two adjacent ones of the LED lamps is an arithmetic progression or a geometric progression from a center to an edge, the television backlight dimming method comprises following steps:

acquiring a minimum horizontal distance between the LED lamps in a reference region and the LED lamps in non-reference regions; and adjusting brightness of each of the LED lamps in the non-reference regions according to brightness of the LED lamps in the reference region, the minimum horizontal distance, and a preset distance rule, wherein each of M and N is positive integer, wherein the preset distance rule comprises one of a first distance rule corresponding to the arithmetic progression and a second distance rule corresponding to the geometric progression, wherein the step of adjusting the brightness of each of the LED lamps in the non-reference regions according to the brightness of the LED lamps in the reference region, the minimum horizontal distance and the preset distance rule comprises one of:

determining each of first horizontal LED lamps in a same row among the LED lamps in each of the non-reference regions according to the LED lamps in the reference region, adjusting brightness of each of the first horizontal LED lamps according to the brightness of the LED lamps in the reference region, the minimum horizontal distance, a preset horizontal common difference, and the first distance rule, and adjusting the brightness of each of the LED lamps in the non-reference regions according to the brightness of each of the first horizontal LED lamps; and determining each of second horizontal LED lamps in a same row among the LED lamps in each of non-reference regions according to the LED lamps in the reference region, adjusting brightness of each of the second horizontal LED lamps according to the brightness of the LED lamps in the reference region, the minimum horizontal distance, a preset horizontal geometric difference value, and the second distance rule, and adjusting the brightness of each of the LED lamps in the non-reference regions according to the brightness of each of the second horizontal LED lamps.

2. The television backlight dimming method as claimed in claim 1, wherein the step of adjusting the brightness of each of the LED lamps in the non-reference regions according to the brightness of each of the first horizontal LED lamps comprises:

making sure that a distance between each column of the LED lamps is same; and adjusting brightness of the LED lamps in each row in the non-reference region according to the brightness of each of the first horizontal LED lamps, and adjusting the brightness of each of the LED lamps in the non-reference region according to the brightness of the LED lamps in each row.

3. The television backlight dimming method as claimed in claim 2, wherein the step of adjusting the brightness of the LED lamps in each row in the non-reference region according to the brightness of each of the first horizontal LED lamps comprises:

determining brightness of the LED lamps of the first horizontal LED lamps in a target row according to the brightness of each of the first horizontal LED lamps, and adjusting brightness of the LED lamps in other rows in the backlight except the target row to be same brightness as the brightness of the LED lamps in the target row.

4. The television backlight dimming method as claimed in claim 1, wherein the step of adjusting the brightness of each of the LED lamps in the non-reference regions according to the brightness of each of the first horizontal LED lamps comprises:

making sure that a distance between each column of the LED lamps is not same;

acquiring a minimum vertical distance between the LED lamps in the reference region and the LED lamps in the non-reference region, and determining that the distance between each column of the LED lamps is an arithmetic progression from the center to the edge;

adjusting brightness of the LED lamps in each row according to the brightness of the LED lamps in the reference region, the minimum vertical distance, and a preset vertical common difference; and adjusting the brightness of each of the LED lamps in the non-reference region according to the brightness of LED lamps in each row and the brightness of each of the first horizontal LED lamps.

5. The television backlight dimming method as claimed in claim 1, wherein the step of adjusting the brightness of each of the LED lamps in the non-reference regions according to the brightness of each of the first horizontal LED lamps comprises:

making sure that a distance between each column of the LED lamps is not same;

acquiring a minimum vertical distance between the LED lamps in the reference region and the LED lamps in the non-reference region, and determining that the distance between each column of the LED lamps is a geometric progression from the center to the edge;

adjusting brightness of the LED lamps in each row according to the brightness of the LED lamps in the reference region, the minimum vertical distance, and a preset vertical geometric difference value; and adjusting the brightness of each of the LED lamps in the non-reference region according to the brightness of the LED lamps in each row and the brightness of each of the first horizontal LED lamps.

6. The television backlight dimming method as claimed in claim 1, wherein the reference region is an area in a middle of the backlight in a horizontal direction of the backlight; the non-reference region is an area in the backlight except the reference region; and the minimum horizontal distance is a horizontal distance between the LED lamps in the reference region and the LED lamps in the non-reference region in the horizontal direction of the backlight.

7. The television backlight dimming method as claimed in claim 6, wherein if a user is not satisfied with the step of adjusting the brightness of each of the LED lamps in the non-reference regions according to the brightness of the LED lamps in the reference region, the minimum horizontal distance, and the preset distance rule, adjust one of the LED lamps of the backlight individually according to a compensation coefficient.

8. A television backlight dimming device, wherein the television backlight dimming device comprises: a memory, a processor, and a television backlight adjusting program stored on the memory and being executed in the processor, and wherein a backlight comprises M rows and N columns of LED lamps, in each row of the LED lamps, a distance between two adjacent LED lamps is an arithmetic progression or a geometric progression from a center to an edge, and when the television backlight adjusting program is executed by the processor, to implement a television backlight dimming method comprising following steps:

acquiring a minimum horizontal distance between the LED lamps in a reference region and the LED lamps in non-reference regions; and adjusting brightness of each of the LED lamps in the non-reference regions according to brightness of the LED lamps in the reference region, the minimum horizontal distance, and a preset distance rule, wherein each of M and N is positive integer, wherein the preset distance rule comprises one of a first distance rule corresponding to the arithmetic progression and a second distance rule corresponding to the geometric progression, and wherein the step of adjusting the brightness of each of the LED lamps in the non-reference regions according to the brightness of the LED lamps in the reference region, the minimum horizontal distance and the preset distance rule comprises one of:

determining each of first horizontal LED lamps in a same row among the LED lamps in each of the non-reference regions according to the LED lamps in the reference region, adjusting brightness of each of the first horizontal LED lamps according to the brightness of the LED lamps in the reference region, the minimum horizontal distance, a preset horizontal common difference, and the first distance rule, and adjusting the brightness of each of the LED lamps in the non-reference regions according to the brightness of each of the first horizontal LED lamps; and determining each of second horizontal LED lamps in a same row among the LED lamps in each of non-reference regions according to the LED lamps in the reference region, adjusting brightness of each of the second horizontal LED lamps according to the brightness of the LED lamps in the reference region, the minimum horizontal distance, a preset horizontal geometric difference value, and the second distance rule, and adjusting the brightness of each of the LED lamps in the non-reference regions according to the brightness of each of the second horizontal LED lamps.

9. A computer-readable storage medium, wherein the computer-readable storage medium stores a television backlight adjusting program, and wherein a backlight comprises M rows and N columns of LED lamps, in each row of the LED lamps, a distance between two adjacent LED lamps is an arithmetic progression or a geometric progression from a center to an edge, and when the television backlight adjusting program is executed by a processor, to implement a television backlight dimming method comprising following steps:

acquiring a minimum horizontal distance between the LED lamps in a reference region and the LED lamps in non-reference regions; and adjusting brightness of each of the LED lamps in the non-reference regions according to brightness of the LED lamps in the reference region, the minimum horizontal distance, and a preset distance rule, wherein each of M and N is positive integer, wherein the preset distance rule comprises one of a first distance rule corresponding to the arithmetic progression and a second distance rule corresponding to the geometric progression, and wherein the step of adjusting the brightness of each of the LED lamps in the non-reference regions according to the brightness of the LED lamps in the reference region, the minimum horizontal distance and the preset distance rule comprises one of:

determining each of first horizontal LED lamps in a same row among the LED lamps in each of the non-reference regions according to the LED lamps in the reference region, adjusting brightness of each of the first horizontal LED lamps according to the brightness of the LED lamps in the reference region, the minimum horizontal distance, a preset horizontal common difference, and the first distance rule, and adjusting the brightness of each of the LED lamps in the non-reference regions according to the brightness of each of the first horizontal LED lamps; and determining each of second horizontal LED lamps in a same row among the LED lamps in each of non-reference regions according to the LED lamps in the reference region, adjusting brightness of each of the second horizontal LED lamps according to the brightness of the LED lamps in the reference region, the minimum horizontal distance, a preset horizontal geometric difference value, and the second distance rule, and adjusting the brightness of each of the LED lamps in the non-reference regions according to the brightness of each of the second horizontal LED lamps.

10. The television backlight dimming device as claimed in claim 8, wherein the step of adjusting the brightness of each of the LED lamps in the non-reference regions according to the brightness of each of the first horizontal LED lamps comprises:

making sure that a distance between each column of the LED lamps is same; and adjusting brightness of the LED lamps in each row in the non-reference region according to the brightness of each of the first horizontal LED lamps, and adjusting the brightness of each of the LED lamps in the non-reference region according to the brightness of the LED lamps in each row.

11. The television backlight dimming device as claimed in claim 10, wherein the step of adjusting the brightness of the LED lamps in each row in the non-reference region according to the brightness of each of the first horizontal LED lamps comprises:

determining brightness of the LED lamps of the first horizontal LED lamps in a target row according to the brightness of each of the first horizontal LED lamps, and adjusting brightness of the LED lamps in other rows in the backlight except the target row to be same brightness as the brightness of the LED lamps in the target row.

12. The television backlight dimming device as claimed in claim 8, wherein the step of adjusting the brightness of each of the LED lamps in the non-reference regions according to the brightness of each of the first horizontal LED lamps comprises:

making sure that a distance between each column of the LED lamps is not same;

acquiring a minimum vertical distance between the LED lamps in the reference region and the LED lamps in the non-reference region, and determining that the distance between each column of the LED lamps is an arithmetic progression from the center to the edge;

adjusting brightness of the LED lamps in each row according to the brightness of the LED lamps in the reference region, the minimum vertical distance, and a preset vertical common difference; and adjusting the brightness of each of the LED lamps in the non-reference region according to the brightness of LED lamps in each row and the brightness of each of the first horizontal LED lamps.

13. The television backlight dimming device as claimed in claim 8, wherein the step of adjusting the brightness of each of the LED lamps in the non-reference regions according to the brightness of each of the first horizontal LED lamps comprises:

making sure that a distance between each column of the LED lamps is not same;

acquiring a minimum vertical distance between the LED lamps in the reference region and the LED lamps in the non-reference region, and determining that the distance between each column of the LED lamps is a geometric progression from the center to the edge;

adjusting brightness of the LED lamps in each row according to the brightness of the LED lamps in the reference region, the minimum vertical distance, and a preset vertical geometric difference value; and adjusting the brightness of each of the LED lamps in the non-reference region according to the brightness of the LED lamps in each row and the brightness of each of the first horizontal LED lamps.

14. The television backlight dimming device as claimed in claim 8, wherein the reference region is an area in a middle of the backlight in a horizontal direction of the backlight; the non-reference region is an area in the backlight except the reference region; and the minimum horizontal distance is a horizontal distance between the LED lamps in the reference region and the LED lamps in the non-reference region in the horizontal direction of the backlight.

15. The computer-readable storage medium as claimed in claim 9, wherein the step of adjusting the brightness of each of the LED lamps in the non-reference regions according to the brightness of each of the first horizontal LED lamps comprises:

making sure that a distance between each column of the LED lamps is same; and adjusting brightness of the LED lamps in each row in the non-reference region according to the brightness of each of the first horizontal LED lamps, and adjusting the brightness of each of the LED lamps in the non-reference region according to the brightness of the LED lamps in each row.

16. The computer-readable storage medium as claimed in claim 15, wherein the step of adjusting the brightness of the LED lamps in each row in the non-reference region according to the brightness of each of the first horizontal LED lamps comprises:

determining brightness of the LED lamps of the first horizontal LED lamps in a target row according to the brightness of each of the first horizontal LED lamps, and adjusting brightness of the LED lamps in other rows in the backlight except the target row to be same brightness as the brightness of the LED lamps in the target row.

17. The computer-readable storage medium as claimed in claim 9, wherein the step of adjusting the brightness of each of the LED lamps in the non-reference regions according to the brightness of each of the first horizontal LED lamps comprises:

making sure that a distance between each column of the LED lamps is not same;

acquiring a minimum vertical distance between the LED lamps in the reference region and the LED lamps in the non-reference region, and determining that the distance between each column of the LED lamps is an arithmetic progression from the center to the edge;

adjusting brightness of the LED lamps in each row according to the brightness of the LED lamps in the reference region, the minimum vertical distance, and a preset vertical common difference; and adjusting the brightness of each of the LED lamps in the non-reference region according to the brightness of LED lamps in each row and the brightness of each of the first horizontal LED lamps.

18. The computer-readable storage medium as claimed in claim 9, wherein the step of adjusting the brightness of each of the LED lamps in the non-reference regions according to the brightness of each of the first horizontal LED lamps comprises:

making sure that a distance between each column of the LED lamps is not same;

acquiring a minimum vertical distance between the LED lamps in the reference region and the LED lamps in the non-reference region, and determining that the distance between each column of the LED lamps is a geometric progression from the center to the edge;

adjusting brightness of the LED lamps in each row according to the brightness of the LED lamps in the reference region, the minimum vertical distance, and a preset vertical geometric difference value; and adjusting the brightness of each of the LED lamps in the non-reference region according to the brightness of the LED lamps in each row and the brightness of each of the first horizontal LED lamps.

19. The computer-readable storage medium as claimed in claim 9, wherein the reference region is an area in a middle of the backlight in a horizontal direction of the backlight; the non-reference region is an area in the backlight except the reference region; and the minimum horizontal distance is a horizontal distance between the LED lamps in the reference region and the LED lamps in the non-reference region in the horizontal direction of the backlight.

* * * * *